United States Patent
Hashizume et al.

(10) Patent No.: US 8,088,211 B2
(45) Date of Patent: Jan. 3, 2012

(54) ALUMINUM PIGMENT, PROCESS FOR PRODUCTION THEREOF AND RESIN COMPOSITION

(75) Inventors: Yoshiki Hashizume, Osaka (JP); Taro Morimitsu, Osaka (JP)

(73) Assignee: Toyo Aluminium Kabushiki Kaisha, Osaka-shi (JP)

( * ) Notice: Subject to any disclaimer, the term of this patent is extended or adjusted under 35 U.S.C. 154(b) by 1 day.

(21) Appl. No.: 10/525,068

(22) PCT Filed: Apr. 28, 2003

(86) PCT No.: PCT/JP03/05484
§ 371 (c)(1),
(2), (4) Date: Feb. 18, 2005

(87) PCT Pub. No.: WO2004/096921
PCT Pub. Date: Nov. 11, 2004

(65) Prior Publication Data
US 2006/0150864 A1 Jul. 13, 2006

(51) Int. Cl.
C09C 1/62 (2006.01)
C09C 1/00 (2006.01)
C04B 14/00 (2006.01)
C04B 14/04 (2006.01)

(52) U.S. Cl. ........ 106/404; 106/403; 106/415; 106/419; 106/481; 106/483

(58) Field of Classification Search ............. 106/404, 106/403, 415, 419, 481, 483, 490, 479, 499; 427/407.1
See application file for complete search history.

(56) References Cited

U.S. PATENT DOCUMENTS

| | | | |
|---|---|---|---|
| 2,885,366 A | 5/1959 | Iler | |
| 3,954,496 A | 5/1976 | Batzar | |
| 4,842,837 A * | 6/1989 | Shimizu et al. | 423/335 |
| 5,028,639 A | 7/1991 | Treutlein et al. | |
| 5,296,032 A | 3/1994 | Jenkins et al. | |
| 5,364,467 A * | 11/1994 | Schmid et al. | 106/404 |
| 5,624,486 A * | 4/1997 | Schmid et al. | 106/404 |
| 5,637,143 A * | 6/1997 | Jenkins et al. | 106/404 |
| 5,653,794 A * | 8/1997 | Weber et al. | 106/442 |
| 5,688,314 A * | 11/1997 | Nishimagi et al. | 106/443 |
| 6,488,757 B2 * | 12/2002 | Glausch | 106/415 |
| 6,894,089 B2 * | 5/2005 | Mei et al. | 523/212 |
| 7,045,212 B2 * | 5/2006 | Hashizume et al. | 428/403 |
| 2004/0194663 A1* | 10/2004 | Li et al. | 106/403 |

FOREIGN PATENT DOCUMENTS

| | | |
|---|---|---|
| DE | 198 36 810 A1 | 2/2000 |
| EP | 0583919 A1 | 2/1994 |
| GB | 1140052 A | 1/1969 |
| JP | 55-90560 A | 7/1980 |

(Continued)

Primary Examiner — Jerry Lorengo
Assistant Examiner — Shuangyi Abu Ali
(74) Attorney, Agent, or Firm — Birch, Stewart, Kolasch & Birch, LLP (57) ABSTRACT

An aluminum pigment having aluminum particles, a molybdenum coat comprising a molybdenum oxide and/or a molybdenum hydrate covering the surface of each aluminum particle and a silica coat comprising amorphous silica and/or a coat prepared from a silane coupling agent further covering this molybdenum coat is provided as an aluminum pigment having excellent dispersibility and stability, neither generating hydrogen gas nor agglomerating during storage and providing excellent designability for the appearance of a film. With respect to 100 parts by mass of aluminum, the content of molybdenum is preferably in the range of 0.01 to 5 parts by mass, and the content of silicon is preferably in the range of 1 to 20 parts by mass.

6 Claims, 3 Drawing Sheets

FOREIGN PATENT DOCUMENTS

| | | |
|---|---|---|
| JP | 55-90561 A | 7/1980 |
| JP | 55-158202 A | 12/1980 |
| JP | 56-100865 A | 8/1981 |
| JP | 56-139566 A | 10/1981 |
| JP | 59-74201 A | 4/1984 |
| JP | 63-56566 A | 3/1988 |
| JP | 1-54386 B2 | 11/1989 |
| JP | 4-318181 A | 11/1992 |
| JP | 6-9897 A | 1/1994 |
| JP | 6-57171 A | 3/1994 |
| JP | 7-3185 A | 1/1995 |
| JP | 7-62262 A | 3/1995 |
| JP | 7-70468 A | 3/1995 |
| JP | 7-133440 A | 5/1995 |
| JP | 9-104833 A | 4/1997 |
| JP | 9-316357 A | 12/1997 |
| JP | 9-328629 A | 12/1997 |
| JP | 10-88026 A | 4/1998 |

* cited by examiner

| FORM SILICA COAT AND COAT PREPARED FROM SILANE COUPLING AGENT |
|---|

| FORM SILICA COAT |
|---|

S401

| FORM COAT PREPARED FROM SILANE COUPLING AGENT |
|---|

S403

ALUMINUM PIGMENT, PROCESS FOR PRODUCTION THEREOF AND RESIN COMPOSITION

TECHNICAL FIELD

The present invention relates to an aluminum pigment. More detailedly, the present invention relates to an aluminum pigment preferably employed for a water-based paint or water-color ink and a method of manufacturing the same, and a resin composition blended with the same.

BACKGROUND ART

A metallic paint and metallic ink have recently been used in various fields of automobile finishes, electric appliances, buildings, stationery products, business and office machines, communication apparatuses, cosmetics and the like, due to specific designability thereof.

A film formed with a metallic paint reflects external incident light with a flaky metallic pigment contained in the film, to exhibit a glittery design. The reflection of light presents a unique appearance excellent in designability along with each color tone of the film.

Aluminum is excellent in metallic luster, low-priced and easy to handle due to small specific gravity, and hence a metallic pigment mainly containing aluminum flakes (simply referred to as "aluminum pigment" in this specification) is applied to a metallic design for automobile paint finish, plastic paint finish, printing ink or a resin molding in general.

In the field of paints, on the other hand, a water-based paint containing no organic solvent is increasingly used as a resource-saving and non-polluting countermeasure. Therefore, a demand for an aluminum pigment having excellent water dispersibility preferably compoundable with the water-based paint, is also enlarged.

In order to satisfy this demand, an aluminum pigment prepared by treating the surfaces of aluminum flakes with saturated or unsaturated fatty acid such as stearic acid or oleic acid and a derivative thereof and adding a surface active agent thereto for providing water dispersibility has been generally provided as an aluminum pigment employed for a water-based paint.

However, this water-dispersive aluminum pigment disadvantageously exhibits low storage stability upon blending into a water-based paint and low weather resistance after application. In other words, a water-based paint blended with the water-dispersive aluminum pigment causes such a problem that dispersibility of the aluminum pigment is reduced during storage to result in seeding and remarkably deteriorating the properties of the paint or the aluminum pigment reacts with water to generate a large quantity of hydrogen gas exploding a container. When the water-based paint is applied to a portion such as the finishes of an automobile or a building exposed to severe environment, further, the designability is disadvantageously deteriorated after the application.

In general, aluminum having a natural protective oxide layer on the surface thereof is stable in the atmosphere containing oxygen and exhibits excellent corrosion resistance against an electrolyte contained in neutral water. However, the natural protective oxide layer of aluminum may not exhibit sufficient corrosion resistance against an acidic or alkaline aqueous solution but may be dissolved. Particularly in recent years, a metallic paint containing an aluminum pigment has been frequently exposed to environment having severe acid conditions due to acid rain or the like, and it is difficult to sufficiently protect an aluminum pigment from corrosion with only the natural protective oxide layer.

While a large number of techniques have been developed in order to solve these problems, techniques disclosed in Japanese Patent Publication No. 1-54386, Japanese Patent Laying-Open No. 59-74201, Japanese Patent Laying-Open No. 55-158202, Japanese Patent Laying-Open No. 4-318181, U.S. Pat. No. 5,296,032, Japanese Patent Laying-Open No. 6-57171 and the like can be listed as relatively practical recent well-known techniques.

For example, Japanese Patent Publication No. 1-54386 discloses a method of treating an aluminum pigment with chromic acid. While chemical stability of the aluminum pigment is improved according to this method, the reactivity of a treatment solution is too strong to treat a fine aluminum pigment or a problem arises in labor sanitation or environment due to employment of a hexavalent chromium compound.

Japanese Patent Laying-Open No. 59-74201 discloses a method of treating an aluminum pigment with ammonium vanadate. This treatment is not yet put into practice due to large change of the color tone of the aluminum pigment resulting from the treatment.

Further, Japanese Patent Laying-Open No. 55-158202 discloses a method of covering an aluminum pigment with acidic phosphoric ester. While an excellent color tone and excellent chemical stability are attained according to this method, a treating agent exerts unpreferable influence on adhesion between the aluminum pigment and resin when preparing a two-coat one-bake or two-coat two-bake film to result in a remarkable problem of interlayer peeling between a base metallic film layer and a top coat layer.

Japanese Patent Laying-Open No. 4-318181 discloses a method of treating an aluminum pigment with a treatment solution containing an oxidizer such as molybdic acid, phosphate anions and alkaline earth metal ions. While an aluminum pigment having excellent chemical stability can be prepared by this method, the phosphate anions or the alkaline earth metal ions contained in the treatment solution tend to deteriorate the physical properties of the film such as moisture resistance.

While U.S. Pat. No. 5,296,032 discloses a method of treating an aluminum pigment with heteropolyanions of phosphomolybdic acid or the like, no sufficient chemical stability of the aluminum pigment can be attained through this treatment.

Further, Japanese Patent Laying-Open No. 6-57171 discloses a method of treating an aluminum pigment with ammonium molybdate and thereafter further stabilizing the aluminum pigment by adding molybdate or the like. While it is possible to obtain an aluminum pigment having excellent chemical stability according to this method with no problem as to film physical properties, manufacturing steps are disadvantageously complicated.

U.S. Pat. No. 2,885,366 discloses a method of covering various core materials with amorphous silica layers, and also describes Example employing aluminum powder as a core material. However, this silica covering is performed in an aqueous solution having such strong alkalinity that the aluminum powder may react to generate a large quantity of hydrogen gas during a treatment step, to result in an extreme risk. This patent also discloses a method of providing an intermediate layer of basic salt of aluminum or chromium on the core material in order to efficiently cover the same with the amorphous silica layer, it has been difficult to homogeneously cover an aluminum pigment.

While Japanese Patent Laying-Open No. 7-3185 discloses a method of manufacturing an aluminum pigment having excellent corrosion resistance by covering the surface of an aluminum pigment with siloxane and further covering the same with synthetic resin, the thickness of the aluminum pigment having the siloxane coat covered with synthetic resin is increased to disadvantageously deteriorate the appearance/gloss or reduce opacity by protrusion from the film.

While provision of an aluminum pigment having excellent dispersibility and stability, neither generating hydrogen gas nor agglomerating during storage and providing excellent designability for the appearance of a film is strongly demanded as hereinabove described, no well-known technique can provide an aluminum pigment sufficiently requiring this requirement.

DISCLOSURE OF THE INVENTION

On the basis of the aforementioned circumstances, therefore, an object of the present invention is to provide an aluminum pigment, having excellent dispersibility and stability, neither generating hydrogen gas nor agglomerating during storage and providing excellent designability for the appearance of a film, which can be preferably blended into a water-based paint or water-color ink.

Another object of the present invention is to provide a method of manufacturing an aluminum pigment, having excellent dispersibility and stability, neither generating hydrogen gas nor agglomerating during storage and providing excellent designability for the appearance of a film, which can be preferably blended into a water-based paint or water-color ink.

Still another object of the present invention is to provide a resin composition, having excellent dispersibility and stability, neither generating hydrogen gas nor agglomerating during storage and providing excellent designability for the appearance of a film, which can be preferably employable as a water-based paint or water-color ink.

A further object of the present invention is to provide a water-based paint and water-color ink each having excellent dispersibility and stability, neither generating hydrogen gas nor agglomerating during storage and providing excellent designability for the appearance of a film.

The inventors have determined that the surface of each aluminum particle may be covered with a coat of an aqueous solution having poor reactivity while not damaging the designability of a film and having the property of preventing the generation of hydrogen gas or the like during storage in order to attain the aforementioned of the present invention. Thus, experiments were made covering the surfaces of aluminum particles with coats of various compositions and studying the coated particles.

As a result of these studies, it has been found that the surface of each aluminum particle may be covered with a molybdenum coat comprising a molybdenum oxide and/or a molybdenum hydrate and the surface of the molybdenum coat may be covered with a silica coat comprising amorphous silica and/or a coat obtained from a silane coupling agent. It has also been found that a sufficient effect is attained without forming the molybdenum coat on the surface of each aluminum particle, when the silica coat and the coat obtained from the silane coupling agent are formed together.

The present invention has also studied the particular manufacturing method to be employed in order to cover the surface of each aluminum particle with a molybdenum coat, a silica coat or a coat prepared from a silane coupling agent. As a result of these studies, it has been found that the aluminum pigment can be efficiently manufactured by employing the specific manufacturing of the present invention.

An aluminum pigment according to the present invention has aluminum particles, a molybdenum coat comprising a molybdenum oxide and/or a molybdenum hydrate covering the surface of each aluminum particle and a silica coat comprising amorphous silica and/or a coat prepared from a silane coupling agent further covering the molybdenum coat.

Another aluminum pigment according to the present invention has aluminum particles, a silica coat comprising amorphous silica covering the surface of each aluminum particle and a coat prepared from a silane coupling agent further covering the silica coat.

The content of molybdenum is preferably in the range of 0.01 to 5 parts by mass with respect to 100 parts by mass of the aluminum particles if the inventive aluminum pigment contains the molybdenum coat, whereas the content of silicon is preferably in the range of 1 to 20 parts by mass regardless of presence/absence of the molybdenum coat.

The silane coupling agent employed in the present invention is preferably at least one selected from compounds having the following structure:

$R_A$: alkyl group or aryl group or alkenyl group, having a carbon number of 2 to 18
$R_B$: alkyl group having a carbon number of 1 to 3

The method of manufacturing an aluminum pigment according to the present invention comprises the steps of forming a molybdenum coat comprising a molybdenum oxide and/or a molybdenum hydrate on the surface of each aluminum particle by stirring a dispersive solution containing aluminum particles and a molybdenum compound and forming a silica coat comprising amorphous silica and/or a coat prepared from a silane coupling agent on the surface of the molybdenum coat of each aluminum particle by adjusting the pH of the dispersive solution containing the aluminum particles each having the molybdenum coat, an organic silicon compound and/or the silane coupling agent and a hydrolytic catalyst thereby hydrolyzing the organic silicon compound and/or the silane coupling agent.

Another method of manufacturing an aluminum pigment according to the present invention includes the steps of forming a molybdenum coat comprising a molybdenum oxide and/or a molybdenum hydrate on the surface of each aluminum particle by stirring a dispersive solution containing aluminum particles and a molybdenum compound, forming a silica coat comprising amorphous silica on the surface of the molybdenum coat of each aluminum particle by adjusting the pH of a dispersive solution containing the aluminum particles each having the molybdenum coat, an organic silicon compound and a hydrolytic catalyst thereby hydrolyzing the organic silicon compound and forming a coat prepared from a silane coupling agent on the surface of the silica coat of each aluminum particle by adjusting the pH of a dispersive solution containing the aluminum particles each having the silica coat, the silane coupling agent and a hydrolytic catalyst thereby hydrolyzing the silane coupling agent.

Still another method of manufacturing an aluminum pigment according to the present invention includes the step of forming a silica coat comprising amorphous silica and a coat prepared from a silane coupling agent on the surface of each aluminum particle by adjusting the pH of a dispersive solution containing aluminum particles, an organic silicon compound, the silane coupling agent and a hydrolytic catalyst thereby hydrolyzing the organic silicon compound and the silane coupling agent.

Or, a further method of manufacturing an aluminum pigment according to the present invention includes the steps of forming a silica coat comprising amorphous silica on the surface of each aluminum particle by adjusting the pH of a dispersive solution containing aluminum particles, an organic silicon compound and a hydrolytic catalyst thereby hydrolyzing the organic silicon compound and forming a coat prepared from a silane coupling agent on the surface of the silica coat of each aluminum particle by adjusting the pH of a dispersive solution containing the aluminum particles each having the silica coat, the silane coupling agent and a hydrolytic catalyst thereby hydrolyzing the silane coupling agent.

In the step of forming the molybdenum coat on the surface of each aluminum particle, it is preferable to employ one or at least two selected from a group consisting of peroxidic polymolybdic acid, ammonium molybdate and phosphomolybdic acid as the molybdenum compound.

In the aforementioned step of forming the silica coat, it is preferable to employ tetraethoxysilane and/or tetramethoxysilane as the organic silicon compound.

In the aforementioned step of forming the silica coat and/or the coat prepared from the silane coupling agent, it is recommended to employ a basic catalyst as the hydrolytic catalyst and adjust the pH in the range of 7.0 to 11.0.

In the aforementioned step of forming the silica coat and/or the coat prepared from the silane coupling agent, further, it is preferable to employ one or at least two selected from a group consisting of triethanol amine, ammonia, ethylenediamine and 3-aminopropyl triethoxysilane as the hydrolytic catalyst.

In the aforementioned step of forming the silica coat and/or the coat prepared from the silane coupling agent, an acidic catalyst may be employed as the hydrolytic catalyst, and the pH may be adjusted in the range of 1.5 to 4.0.

In the aforementioned step of forming the silica coat and/or the coat prepared from the silane coupling agent, further, it is preferable to perform hydrolytic reaction at a temperature of 20 to 90° for 1 to 48 hours.

Further, the present invention includes a resin composition containing the inventive aluminum pigment and resin. The inventive resin composition preferably contains 0.1 to 30 percent by mass of the inventive aluminum pigment.

The inventive aluminum pigment is blended into a water-based paint along with a binder and a hydrophilic solvent to be preferably employed. Further, the inventive aluminum pigment is blended into water-color ink along with a binder and a hydrophilic solvent to be preferably employed.

BEST MODES FOR CARRYING OUT THE INVENTION

The present invention is now described in more detail with reference to embodiments.

<Description of Inventive Aluminum Pigment>

The inventive aluminum pigment contains aluminum particles, a coat comprising a molybdenum oxide and/or a molybdenum hydrate (referred to as "molybdenum coat" in this specification) covering the surface of each aluminum particle and an amorphous silica coat (referred to as "silica coat" in this specification) and/or a coat prepared from a silane coupling agent covering this molybdenum coat.

Another inventive aluminum pigment has aluminum particles, a silica coat comprising amorphous silica covering the surface of each aluminum particle and a coat prepared from a silane coupling agent further covering this silica coat.

<Description of Aluminum Particle>

The inventive aluminum pigment is based on aluminum particles.

The aluminum particles employed in the present invention may be constituted of only aluminum or may be constituted of an aluminum base alloy, and the purity thereof is not particularly restricted.

The shape of the aluminum particles employed in the present invention, selectable from various shapes such as granular, platelike, massive and flaky (scaly) shapes, is preferably flaky in order to provide a film with excellent metallic effect and brightness.

The average particle diameter of the aluminum particles employed in the present invention, not particularly restricted, is preferably at least 2 μm, more preferably at least 5 μm in particular. This average particle diameter is preferably not more than 40 μm, more preferably not more than 30 μm in particular. Handling in manufacturing steps is so difficult that the particles tend to readily agglomerate if the average particle diameter is smaller than 2 μm, while the surface of a film may be so roughened that no preferable designability can be implemented when the aluminum pigment is used as a paint if the average particle diameter exceeds 40 μm.

Further, the aluminum particles employed in the present invention preferably have a shape factor (referred to as "aspect ratio" in this specification), obtained by dividing the average particle diameter by the average thickness, of at least 5, particularly preferably at least 15 in particular. This aspect ratio is preferably not more than 1,000, more preferably not more than 500 in particular. The aluminum pigment tends to fall short of brightness if the aspect ratio is less than 5, while the mechanical strength of flakes may be reduced to cause an unstable color tone if the aspect ratio exceeds 1,000.

The average particle diameter of the aluminum particles employed in the present invention is obtained by calculating a volume average from particle size distribution measured by a well-known particle size distribution measuring method such as laser diffraction, micromesh sheaving, Coulter Counter or the like. The average thickness is calculated from hiding power and density of a metallic flake pigment.

A grinding assistant may adhere to the surfaces of the aluminum particles employed in the present invention. Unsaturated fatty acid is used as the grinding assistant in general. For example, oleic acid, linoleic acid, linolenic acid, ricinolic acid, elaidic acid, zoomaric acid, gadoleic acid or erucic acid can be listed as the used unsaturated fatty acid.

<Description of Molybdenum Coat>

One of the inventive aluminum pigments has a molybdenum coat covering the surface of each aluminum particle.

It is assumed that the molybdenum coat is a coat comprising a molybdenum oxide and/or a molybdenum hydrate, while the molybdenum oxide specifically denotes $MoO_3$, $Mo_2O_3$ or the like and the molybdenum hydrate specifically denotes $MoO_3.H_2O$, $MoO_3.H_2O_2.H_2O$ or the like.

The molybdenum coat is so formed on the surface of each aluminum particle employed in the present invention that this coat serves as the core for precipitation for simplifying formation of the silica coat further covering the surface of this molybdenum coat. Further, the molybdenum coat has constant corrosion resistance, so that the aluminum pigment having the molybdenum coat is improved in corrosion resistance. In addition, the molybdenum coat also has an effect of preventing abnormal reaction between a treatment solution (solution containing water and having strong alkalinity or acidity) in the process of forming a silica coat and/or a coat prepared from a silane coupling agent and each aluminum particle covered with the molybdenum coat.

The quantity of Mo contained in the molybdenum coat formed on the surface of each aluminum particle employed in the present invention is preferably at least 0.01 parts by mass, more preferably at least 0.05 parts by mass with respect to 100 parts by mass of the aluminum particles. Further, this content of Mo is preferably not more than 5.0 parts by mass, more preferably not more than 2.0 parts by mass. This content of Mo is desirably varied with the specific surface area of the treated aluminum particles. It is preferable to increase or reduce the content of Mo with respect to aluminum particles having a large or small specific surface area.

Chemical stability tends to lower if the content of Mo is smaller than 0.01 parts by mass, while such inconvenience may result that the color tone (metallic luster) of the aluminum pigment is remarkably reduced, the aluminum pigment agglomerates or film physical properties are deteriorated if the Mo content exceeds 5.0 parts by mass.

The aforementioned molybdenum coat may not be a coat comprising only a molybdenum oxide and/or a molybdenum hydrate but may contain another additive or impurity within the range not damaging the characteristics of the present invention.

<Description of Silica Coat>

The silica coat applied to the inventive aluminum pigment may further cover the surface of the molybdenum coat or may directly cover the aluminum surface along with the coat prepared from the silane coupling agent.

It is assumed that the silica coat is a coat comprising amorphous silica, and amorphous silica specifically denotes siloxane [$H_3SiO(H_2SiO)_nSiH_3$], $SiO_2$, $SiO_2 \cdot nH_2O$ or the like. It is assumed that n represents an arbitrary positive integer in the above.

The inventive aluminum pigment having the silica coat covering the surface of the molybdenum coat of each aluminum particle has corrosion resistance superior to that in a case of having only the molybdenum coat.

Amorphous silica has a hydrophilic surface, whereby the inventive aluminum pigment having the silica coat can be readily dispersed in each of a water-based paint and watercolor ink. Further, amorphous silica is extremely stable in an aqueous solution, whereby the inventive aluminum pigment having the silica coat is extremely stable in an aqueous solution.

Another corrosion inhibitor may be added to the silica coat of the inventive aluminum pigment, in order to further improve the corrosion resistance of the aluminum pigment. While the added corrosion inhibitor is not particularly restricted but a well-known corrosion inhibitor can be employed in a quantity not damaging the effects of the present invention, acidic phosphoric ester, diamer acid, an organic phosphoric compound, metal salt of molybdic acid or the like can be listed.

The aforementioned silica coat may not be a coat comprising only amorphous silica but may contain another additive or impurity in the range not damaging the characteristics of the present invention.

<Description of Coat Prepared from Silane Coupling Agent>

The inventive aluminum pigment is so provided with a coat prepared from a silane coupling agent on the molybdenum coat or the silica coat that reactivity with respect to water can be further suppressed while various effects such as improvement of film physical properties such as adhesion, moisture resistance and weather resistance, improvement of dispersibility in a paint, improvement of orientation of the aluminum pigment etc. can be expected.

However, dispersibility with respect to water may be reduced depending on the type of the used silane coupling agent, while this can be improved by using a proper surface active agent. The coat prepared from the silane coupling agent is obtained by hydrolyzing the following silane coupling agent and reacting the same with a hydroxyl group in the silica coat on the surface of each aluminum particle:

For example, methyl triethoxysilane, methyl trimethoxysilane, dimethyl dimethoxysilane, trimethyl methoxysilane, dimethyl diethoxysilane, trimethyl ethoxysilane, 3-aminopropyl-trimethoxysilane, n-methyl-3-aminopropyl-trimethoxysilane, 3-aminopropyl-triethoxysilane, 3-aminopropyl-tris(2-methoxy-epoxy-silane), n-aminoethyl-3-aminopropyl trimethoxysilane, n-aminoethyl-3-aminopropyl-methyl-dimethoxysilane, 3-methacryloxypropyl-trimethoxysilane, 3-methacryloxypropyl-methyl-dimethoxysilane, 3-acryloxypropyl-trimethoxysilane, 3-glycidyloxypropyl-trimethoxysilane, 3-glycidyloxypropyl-methyl-dimethoxysilane, 3-mercaptopropyl-trimethoxysilane, 3-mercaptopropyl-triethoxysilane, 3-mercaptopropyl-methyl dimethoxysilane, vinyl trichlorosilane, vinyl trimethoxysilane, vinyl triethoxysilane, vinyl-tris(2-methoxyethoxy)silane, vinyl triacetoxysilane, 3-(3,4-epoxycyclohexyl ethyltrimethoxy)silane, γ-aminopropyl triethoxysilane, N-β-(aminoethyl)-γ-aminopropyl trimethoxysilane, 3-ureidopropyl triethoxysilane, 3-chloropropyl trimethoxysilane, 3-anilidopropyl triethoxysilane, 3-(4,5-dihydroimidazolepropyl triethoxy)silane, n-phenyl-3-aminopropyl trimethoxysilane, heptadecafluorodecyl trimethoxysilane, tridecafluorooctyl trimethoxysilane, trifluoropropyl trimethoxysilane, 3-isocyanatepropyl triethoxysilane, p-styryl trimethoxysilane or the like can be listed.

The following compound is used as a particularly preferable silane coupling agent:

$R_A$: alkyl group or aryl group or alkenyl group, having a carbon number of 2 to 18

$R_B$: alkyl group having a carbon number of 1 to 3

More specifically, the following compound is illustrated:

For example, n-propyl trimethoxysilane, isobutyl trimethoxysilane, octyl triethoxysilane, decyl trimethoxysilane, octadecyl triethoxysilane, phenyl trimethoxysilane, phenyl triethoxysilane, diphenyl diethoxysilane or the like can be listed.

The total quantity of silicon contained in the silica coat and the coat prepared from the silane coupling agent provided according to the present invention is preferably at least 1 part by mass, more preferably at least 2 parts by mass with respect to 100 parts by mass of the aluminum particles. This content of silicon is preferably not more than 20 parts by mass, more preferably not more than 15 parts by mass.

Corrosion resistance, water dispersibility, stability etc. tend to lower if this silicon content is smaller than 1 part by mass, while such a problem may arise that the aluminum pigment agglomerates, opacity is reduced or the color tone such as metallic luster is damaged if this silicon content exceeds 20 parts by mass.

<Description of Method of Manufacturing Inventive Aluminum Pigment>

Figure 1:
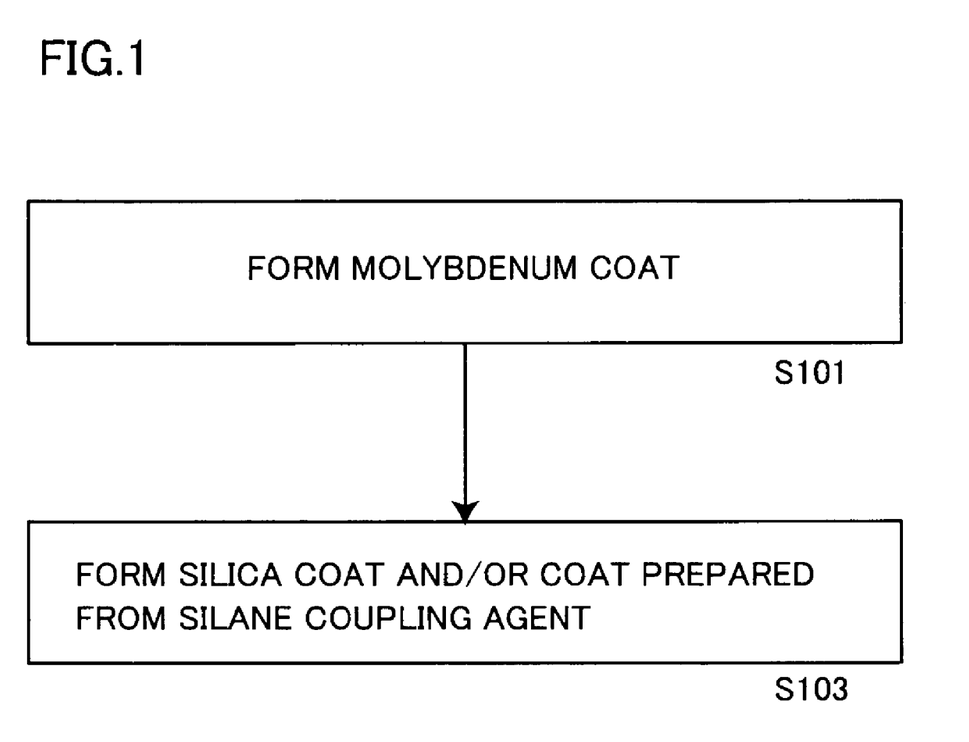
FIG. 1 is a diagram showing an exemplary method of manufacturing an aluminum pigment according to the present invention.

FIG. 1 is a diagram showing an exemplary method of manufacturing an aluminum pigment according to the present invention.

This method of manufacturing an aluminum pigment according to the present invention includes the step (S101) of forming a molybdenum coat comprising a molybdenum oxide and/or a molybdenum hydrate on the surface of each aluminum particle by stirring a dispersive solution containing aluminum particles and a molybdenum compound and the step (S103) of forming a silica coat comprising amorphous silica and/or a coat prepared from a silane coupling agent on the surface of the molybdenum coat of each aluminum particle by adjusting the pH of a dispersive solution containing the aluminum particles each having the molybdenum coat, an organic silicon compound and/or the silane coupling agent and a hydrolytic catalyst thereby hydrolyzing the organic silicon compound and/or the silane coupling agent.

Figure 2:
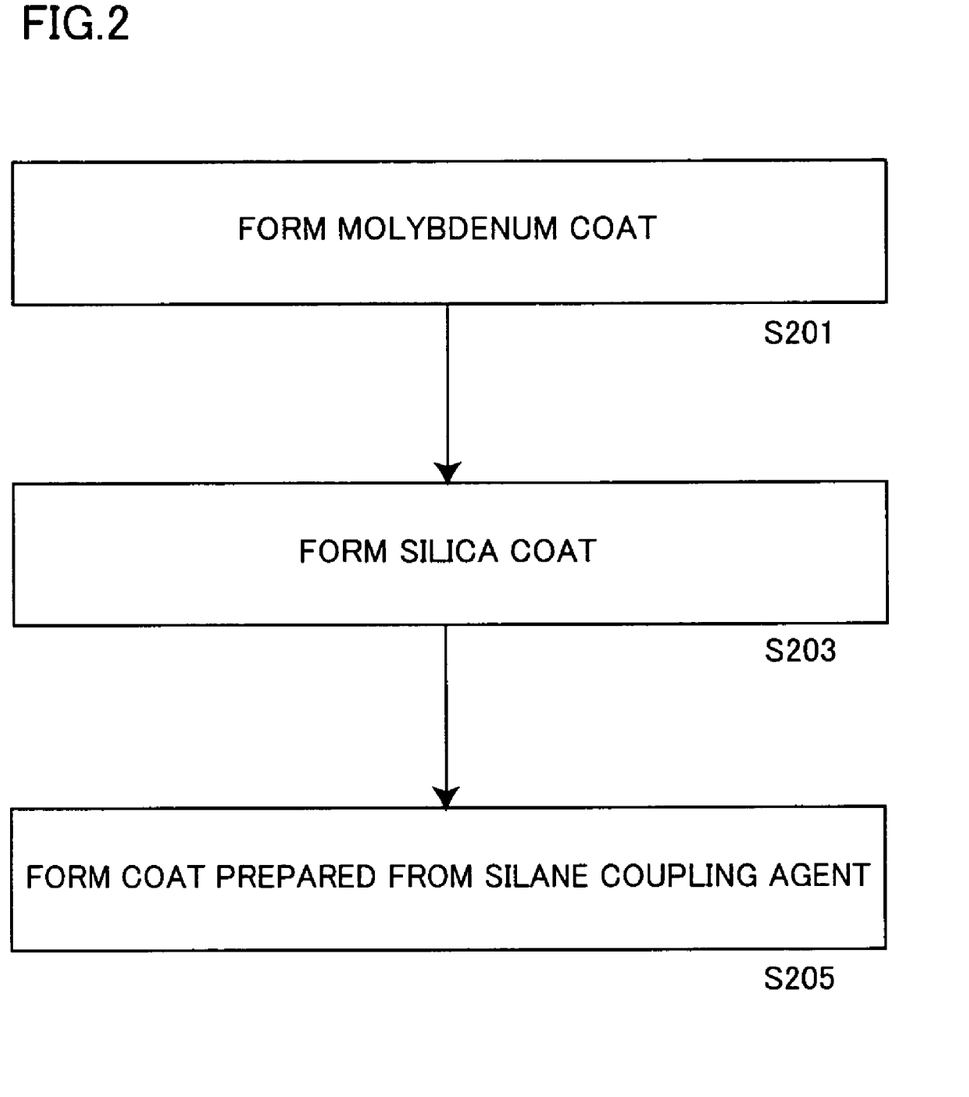
FIG. 2 is a diagram showing another exemplary method of manufacturing an aluminum pigment according to the present invention.

FIG. 2 is a diagram showing another exemplary method of manufacturing an aluminum pigment according to the present invention.

This method of manufacturing an aluminum pigment according to the present invention includes the step (S201) of forming a molybdenum coat comprising a molybdenum oxide and/or a molybdenum hydrate on the surface of each aluminum particle by stirring a dispersive solution containing aluminum particles and a molybdenum compound, the step (S203) of forming a silica coat comprising amorphous silica on the surface of the molybdenum coat of each aluminum particle by adjusting the pH of a dispersive solution containing the aluminum particles each having the molybdenum coat, an organic silicon compound and a hydrolytic catalyst thereby hydrolyzing the organic silicon compound and the step (S205) of forming a coat prepared from a silane coupling agent on the surface of the silica coat of each aluminum particle by adjusting the pH of a dispersive solution containing the aluminum particles each having the silica coat, the silane coupling agent and a hydrolytic catalyst thereby hydrolyzing the silane coupling agent.

Figure 3:
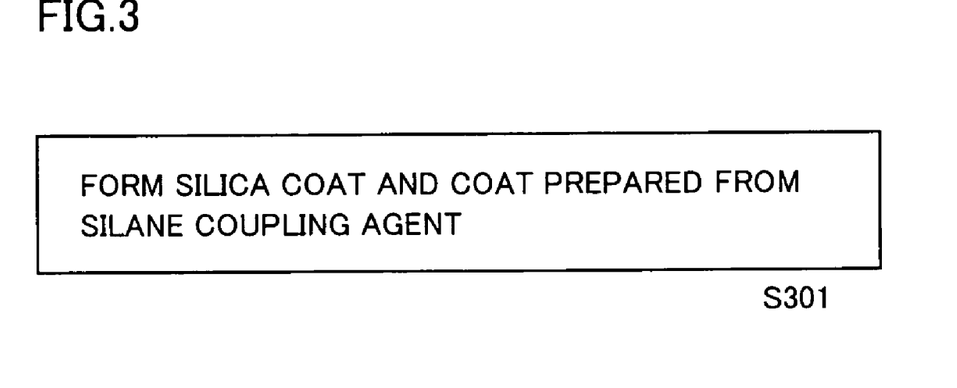
FIG. 3 is a diagram showing still another exemplary method of manufacturing an aluminum pigment according to the present invention.

FIG. 3 is a diagram showing still another exemplary method of manufacturing an aluminum pigment according to the present invention.

This method of manufacturing an aluminum pigment according to the present invention includes the step (S301) of forming a silica coat comprising amorphous silica and a coat prepared from a silane coupling agent on the surface of each aluminum particle by adjusting the pH of a dispersive solution containing aluminum particles, an organic silicon compound, the silane coupling agent and a hydrolytic catalyst thereby hydrolyzing the organic silicon compound and the silane coupling agent.

Figure 4:
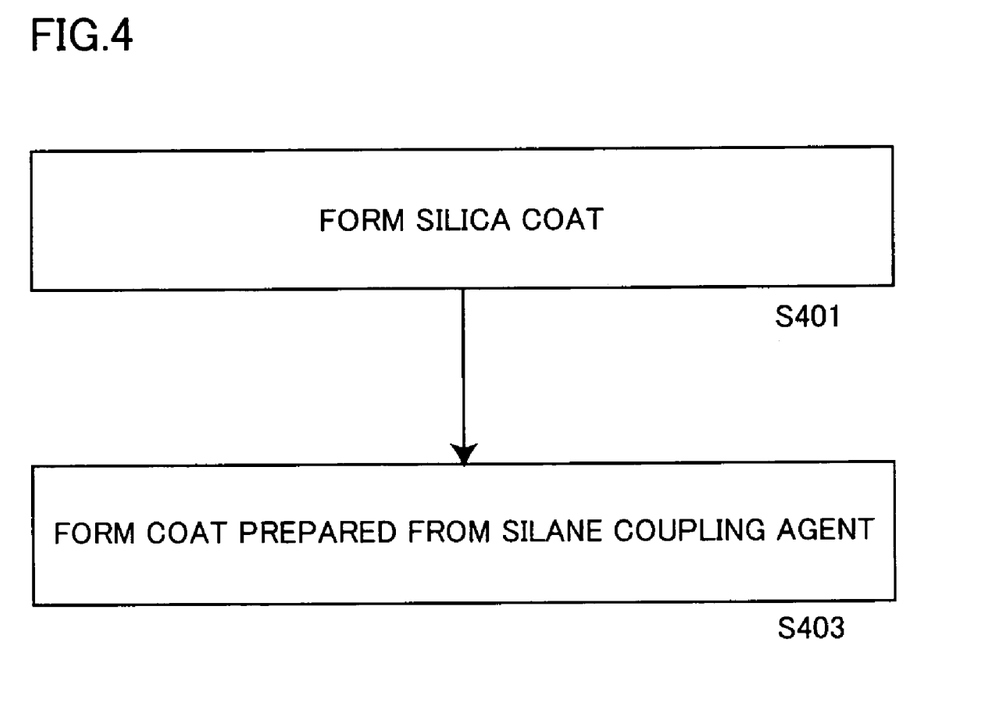
FIG. 4 is a diagram showing a further exemplary method of manufacturing an aluminum pigment according to the present invention.

FIG. 4 is a diagram showing a further exemplary method of manufacturing an aluminum pigment according to the present invention.

Or, this method of manufacturing an aluminum pigment according to the present invention includes the step (S401) of forming a silica coat comprising amorphous silica on the surface of each aluminum particle by adjusting the pH of a dispersive solution containing aluminum particles, an organic silicon compound and a hydrolytic catalyst thereby hydrolyzing the organic silicon compound and the step (S403) of forming a coat prepared from a silane coupling agent on the surface of the silica coat of each aluminum particle by adjusting the pH of a dispersive solution containing the aluminum particles each having the silica coat, the silane coupling agent and a hydrolytic catalyst thereby hydrolyzing the silane coupling agent.

<Method of Covering Aluminum Particle with Molybdenum Coat>

One method of manufacturing an aluminum pigment according to the present invention has the step of forming a molybdenum coat on the surface of each aluminum particle by stirring a dispersive solution containing aluminum particles and a molybdenum compound.

A method of forming the molybdenum coat on the surface of each aluminum particle is not particularly restricted so far as the dispersive solution containing the aluminum particles and the molybdenum compound can be homogeneously stirred according to this method. More specifically, a method of forming the molybdenum coat on the surface of each aluminum particle by stirring or kneading the dispersive solution containing the aluminum particles and the molybdenum compound in a slurry state or a paste state can be listed.

A stirrer employed in the step of stirring the dispersive solution containing the aluminum particles and the molybdenum compound is not particularly restricted but a well-known stirrer capable of efficiently homogeneously stirring the dispersive solution containing the aluminum particles and the molybdenum compound can be employed. More specifically, a kneader, a kneading machine, a rotating container stirrer, a stirring reactor, a V-type stirrer, a double cone stirrer, a screw mixer, a sigma mixer, a flash mixer, an air current stirrer, a ball mill, an edge runner or the like can be listed.

While the molybdenum compound employed in the present invention is not particularly restricted but a well-known molybdenum compound capable of forming a molybdenum coat when added to the dispersive solution containing the aluminum particles and stirred, peroxidic polymolybdic acid, ammonium molybdate, phosphomolybdic acid or the like can be listed as an specific example. The said molybdenum compound may be solely used, or at least two types of such molybdenum compounds may be mixed with each other.

The peroxidic polymolybdic acid, a compound expressed in the following composition formula (1) in general, can be readily prepared by dissolving metal molybdenum powder or molybdenum oxide in a hydrogen peroxide solution of 5 to 40% in concentration:

$$Mo_xO_y \cdot mH_2O_2 \cdot nH_2O \qquad (1)$$

(where x represents 1 or 2, y represents an integer of 2 to 5, and m and n represent arbitrary positive numbers in the composition formula (1)).

A hydrophilic solvent is preferably employed as the solvent for the dispersive solution containing the aluminum particles and the molybdenum compound. More specifically, methyl alcohol, ethyl alcohol, isopropyl alcohol, n-propyl alcohol, t-butyl alcohol, n-butyl alcohol, isobutyl alcohol, ethyl cellosolve, butyl cellosolve, propyleneglycol monobutylether, dipropyleneglycol monomethylether, propyleneglycol monopropylether, acetone or the like can be listed.

The said hydrophilic solvent may contain water, or water may be solely employed as the hydrophilic solvent. Further, it is more preferable to mix the said hydrophilic solvent with water rather than solely employing the said hydrophilic solvent. When the said hydrophilic solvent and water are mixed with each other, contact efficiency between the aluminum particles and the molybdenum compound can be further improved. It is assumed that the solvent includes the said hydrophilic solvent, water and the mixture of the said hydrophilic solvent and water when referred to as "hydrophilic solvent" in this description.

In the dispersive solution containing the aluminum particles and the molybdenum compound, the content of the molybdenum compound is preferably at least 0.02 parts by mass, more preferably at least 0.1 parts by mass with respect to 100 parts by mass of the aluminum particles. Further, this content of the molybdenum compound is preferably not more than 20 parts by mass, more preferably not more than 10 parts by mass.

The treatment effect tends to be insufficient if the content of the molybdenum compound is less than 0.02 parts by mass, while brightness of the aluminum pigment tends to be insufficient if the content of the molybdenum compound exceeds 20 parts by mass.

In this dispersive solution containing the aluminum particles and the molybdenum compound, the content of the hydrophilic solvent is preferably at least 50 parts by mass, more preferably at least 100 parts by mass with respect to 100 parts by mass of the aluminum particles. This content of the hydrophilic solvent is preferably not more than 5,000 parts by mass, more preferably not more than 2,000 parts by mass.

The molybdenum compound tends to so heterogeneously distribute that the aluminum particles remarkably agglomerate if the content of the hydrophilic solvent is less than 50 parts by mass, while the treatment effect of the molybdenum compound for the aluminum particles tends to be insufficient if the content of the hydrophilic solvent exceeds 5,000 parts by mass.

In the step of stirring the dispersive solution containing the aluminum particles and the molybdenum compound, further, the temperature of the dispersive solution in the stirring step is preferably at least 10° C., more preferably at least 30° C. Further, this temperature of the dispersive solution in the stirring step is preferably not more than 100° C., more preferably not more than 80° C.

A reaction time for obtaining a sufficient treatment effect tends to lengthen if this temperature of the dispersive solution in the stirring step is less than 10° C., while danger of acceleration of reaction tends to increase if this temperature of the dispersive solution in the stirring step exceeds 100° C.

In the step of stirring the dispersive solution containing the aluminum particles and the molybdenum compound, the stirring time is preferably at least 0.5 hours, more preferably at least 1.0 hour. Further, this stirring time is preferably not more than 10 hours, more preferably not more than 5 hours.

The treatment effect tends to be insufficient if this stirring time is less than 0.5 hours, while the treatment cost tends to increase if this stirring time exceeds 10 hours.

After this step of stirring the dispersive solution containing the aluminum particles and the molybdenum compound is terminated, it is preferable to filtrate the dispersive solution through a filter after cleaning the same with the said hydrophilic solvent containing no water, for removing water and unreacted products from a cake containing the aluminum particles each having the molybdenum coat.

<Method of Covering Aluminum Particle with Silica Coat>

An exemplary method of manufacturing an aluminum pigment according to the present invention includes the step of forming a silica coat on the surface of each aluminum particle or the surface of the molybdenum coat by adjusting the pH of a dispersive solution containing aluminum particles each having or not having a molybdenum coat, an organic silicon compound and a hydrolytic catalyst thereby hydrolyzing the organic silicon compound.

A method of forming the silica coat is not particularly restricted but any well-known method may be employed so far as the silica coat can be formed on the surface of each aluminum particle or the surface of the molybdenum coat by adjusting the pH of the dispersive solution containing the aluminum particles each having or not having the molybdenum coat, the organic silicon compound and the hydrolytic catalyst thereby hydrolyzing the organic silicon compound according to this method.

More specifically, a method of adding the organic silicon compound to a dispersive solution containing the aluminum particles each having or not having a molybdenum coat and further adding the hydrolytic catalyst for adjusting the pH value of the dispersive solution thereby hydrolyzing the organic silicon compound for forming the silica coat on the surface of each aluminum particle or the surface of the molybdenum coat is preferable. At this time, the aforementioned dispersive solution is preferably stirred at a proper speed so that each component is homogeneously dispersed or dissolved.

While the pH value of the dispersive solution is preferably adjusted by adding the hydrolytic catalyst in the aforementioned step in order to simplify the manufacturing steps, the method of adjusting the pH value of the dispersive solution is not particularly restricted to the method of adding the hydrolytic catalyst but the pH of the dispersive solution may be adjusted by employing another acidic and/or alkaline compound.

It is assumed that the organic silicon compound includes the organic silicon compound and a condensate of the organic silicon compound when referred to as the organic silicon compound in this description.

The organic silicon compound employed in the present invention is not particularly restricted but a well-known organic silicon compound capable of forming the silica coat on the surface of each aluminum particle or the surface of the molybdenum coat by adjusting the pH of the dispersive solution containing the aluminum particles each having or not having the molybdenum coat, the organic silicon compound and the hydrolytic catalyst thereby hydrolyzing the organic silicon compound or a condensate thereof can be employed.

Tetraethoxysilane, tetramethoxysilane, tetraisopropoxysilane or the like or a condensate thereof can be listed as a specific example of such an organic silicon compound. The organic silicon compound may be solely used, or at least two types of such organic silicon compounds may be stirred and used.

<Hydrolytic Catalyst>

The hydrolytic catalyst employed in the present invention is not particularly restricted but a well-known hydrolytic catalyst hydrolyzing the organic silicon compound when the pH of the dispersive solution containing the aluminum particles each having or not having the molybdenum coat, the organic silicon compound and the hydrolytic catalyst is adjusted for forming the silica coat on the surface of each aluminum particle or the surface of the molybdenum coat can be employed.

A basic hydrolytic catalyst such as monoethanolamine, diethanolamine, triethanolamine, ammonia, ethylenediamine, t-butylamine, 3-aminopropyl triethoxysilane, n-2-aminoethyl-3-aminopropyl triethoxysilane, n-2-aminoethyl-3-aminopropylmethyl dimethoxysilane, urea, sodium silicate or sodium hydroxide or an acidic hydrolytic catalyst such as oxalic acid, acetic acid, nitric acid, sulfuric acid, phosphoric acid or phosphonic acid can be listed as a specific example of the aforementioned organic silicon compound.

In consideration of the reaction rate in the aforementioned step, it is more preferable to employ the basic hydrolytic catalyst rather than the acidic hydrolytic catalyst. Among the aforementioned basic hydrolytic catalysts, triethanolamine, ammonia, ethylenediamine or 3-aminopropyl triethoxysilane is particularly preferable in consideration of quality or the like.

<Dispersive Solution>

As a solvent for the dispersive solution containing the aluminum particles each having or not having the molybdenum coat, the organic silicon compound and the hydrolytic catalyst, a hydrophilic solvent is preferably employed. More specifically, it is preferable to employ methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether, acetone or the like, in order to avoid abnormal reaction between the aluminum particles and water.

This hydrophilic solvent may contain water. However, the content of water in this hydrophilic solvent is preferably not more than 20 percent by mass, in order to avoid abnormal reaction between the aluminum particles and water.

In the dispersive solution containing the aluminum particles each having or not having the molybdenum coat, the organic silicon compound and the hydrolytic catalyst, the content of the organic silicon compound is preferably at least 2 parts by mass, more preferably at least 5 parts by mass with respect to 100 parts by mass of the aluminum particles. Further, this content of the organic silicon compound is preferably not more than 200 parts by mass, more preferably not more than 100 parts by mass.

The treatment effect tends to be insufficient if the content of the organic silicon compound is less than 2 parts by mass, while agglomeration of the aluminum particles or reduction of brightness tends to be remarkable if the content of the organic silicon compound exceeds 200 parts by mass. The organic silicon compound may be added gradually or at once.

In this dispersive solution containing the aluminum particles each having or not having the molybdenum coat, the organic silicon compound and the hydrolytic catalyst, the content of the hydrolytic catalyst is preferably at least 0.1 parts by mass, more preferably at least 0.5 parts by mass with respect to 100 parts by mass of the aluminum particles. Further, this content of the hydrolytic catalyst is preferably not more than 20 parts by mass, more preferably not more than 10 parts by mass.

The quantity of precipitation of a silica layer tends to be insufficient if the content of the hydrolytic catalyst is less than 0.1 parts by mass, while agglomeration of the aluminum particles tends to be remarkable if the content of the hydrolytic catalyst exceeds 20 parts by mass.

In this dispersive solution containing the aluminum particles each having or not having the molybdenum coat, the organic silicon compound and the hydrolytic catalyst, the content of the hydrophilic solvent is preferably at least 500 parts by mass, more preferably at least 1,000 parts by mass with respect to 100 parts by mass of the aluminum particles. Further, this content of the hydrophilic solvent is preferably not more than 10,000 parts by mass, more preferably not more than 5,000 parts by mass.

The viscosity of a slurry tends to be so high that it is difficult to stir the slurry if the content of the hydrophilic solvent is less than 500 parts by mass, while the cost for recovering/recycling the treatment solution tends to increase if the content of the hydrophilic solvent exceeds 10,000 parts by mass.

In the step of forming the silica coat on the surface of each aluminum particle having or not having the molybdenum coat, further, the temperature of the dispersive solution in this step is preferably at least 20° C., more preferably at least 30° C. Further, the temperature of the dispersive solution in this stirring step is preferably not more than 90° C., more preferably not more than 80° C.

The rate for forming the silica layer tends to be retarded to increase the treatment time if the temperature of the dispersive solution in this stirring step is less than 20° C., while danger of acceleration of reaction tends to increase if the temperature of the dispersive solution in this stirring step exceeds 90° C.

In this step of forming the silica coat on the surface of each aluminum particle having or not having the molybdenum coat, the reaction time is preferably at least 1 hour, more preferably at least 3 hours. This stirring time is preferably not more than 48 hours, more preferably not more than 24 hours.

The treatment effect tends to be insufficient if this stirring time is less than 1 hour, while the treatment cost tends to increase if this stirring time exceeds 48 hours.

In this step of forming the silica coat on the surface of each aluminum particle having or not having the molybdenum coat, it is necessary to properly adjust the pH value since the pH value of the dispersive solution varies during reaction. While the pH value is preferably adjusted by adding the hydrolytic catalyst at this time, the pH of the dispersive solution may alternatively be adjusted with another acidic and/or alkaline compound in the range not damaging the characteristics of the inventive aluminum pigment.

In this dispersive solution containing the aluminum particles each having or not having the molybdenum coat, the organic silicon compound and the hydrolytic catalyst, the pH is preferably at least 7, more preferably at least 7.5 when employing a basic hydrolytic catalyst. Further, the pH of this dispersive solution is preferably not more than 11, more preferably not more than 10.

The rate for forming the silica layer tends to decrease if the pH of this dispersive solution is less than 7, while agglomeration of the aluminum particles or reduction of brightness tends to increase if the pH of the dispersive solution in this stirring step exceeds 11.

In this step of forming the silica coat on the surface of each aluminum particle having or not having the molybdenum coat, it is more preferable to use a basic hydrolytic catalyst rather than to employ an acidic hydrolytic catalyst due to a higher rate of forming the silica coat and superior productivity. However, employment of an acidic hydrolytic catalyst makes no significant difference from the employment of the basic hydrolytic catalyst in consideration of the quality.

In this dispersive solution containing the aluminum particles each having or not having the molybdenum coat, the organic silicon compound and the hydrolytic catalyst, the pH is at least 1.5, more preferably at least 2 if employing an acidic hydrolytic catalyst. Further, the pH of this dispersive solution is preferably not more than 4, more preferably not more than 3.

Danger of acceleration of reaction tends to increase if the pH of this dispersive solution is less than 1.5, while the rate of precipitation of the silica layer tends to decrease if the pH of the dispersive solution in this stirring step exceeds 4.

<Method of Forming Coat Prepared from Silane Coupling Agent>

In an exemplary method of manufacturing an aluminum pigment according to the present invention, a method of forming a coat prepared from a silane coupling agent is similar to the method of forming the silica coat, and includes the step of forming the coat by hydrolyzing the silane coupling agent.

The coat prepared from the silane coupling agent, formed on the molybdenum coat or the silica coat in the exemplary method of manufacturing an aluminum pigment according to the present invention, is formed by reacting the silane coupling agent with a hydroxyl group in the silica coat when the coat is formed on the silica coat.

When directly providing the coat prepared from the silane coupling agent on each of the aluminum particles having the molybdenum coat, the pH of a dispersive solution containing the aluminum particles each having the molybdenum coat, the silane coupling agent and a hydrolytic catalyst is adjusted to hydrolyze the silane coupling agent for forming the coat prepared from the silane coupling agent on the surface of the molybdenum coat.

When providing the coat prepared from the silane coupling agent on the silica coat, the pH of a dispersive solution containing the aluminum particles each having or not having the molybdenum coat, an organic silica compound, the silane coupling agent and a hydrolytic catalyst is adjusted to hydrolyze the organic silicon compound and the silane coupling agent for forming the coat prepared from the silane coupling agent on the surface of the silica coat.

At this time, the coat prepared from the silane coupling agent may be formed by adding the silane coupling agent after temporarily forming the silica coat by hydrolysis and further hydrolyzing the same in order to carry out formation of the silica coat by hydrolysis of the organic silica compound and formation of the coat by hydrolysis of the silane coupling agent stepwise.

Conditions such as a reaction solvent, the temperature and the hydrolytic catalyst for forming the coat prepared from the silane coupling agent are similar to those for forming the silica coat.

The quantity of the silane coupling agent is 0.1 to 20 parts by mass, more preferably 1 to 10 parts by mass with respect to 100 parts by mass of the aluminum particles. No desired effect tends to be obtained if the quantity is smaller than the above, while the quantity of an unreacted silane coupling agent tends to increase to deteriorate film physical properties or the like if the quantity is excessive.

After the steps of forming the molybdenum coat, the silica coat and the coat prepared from the silane coupling agent on each of the aluminum particles are terminated, it is preferable to clean the dispersive solution with the aforementioned hydrophilic solvent containing no water and filtrate the same through a filter for removing water and an unreacted substance from a cake containing the inventive aluminum pigment.

Thereafter the cake containing the inventive aluminum pigment may be thereafter heat-treated at a temperature in the range of 100 to 500° C. if necessary.

The aforementioned step of forming the molybdenum coat on the surface of each aluminum particle and the step of forming the silica coat and/or the coat prepared from the silane coupling agent on the surface of the molybdenum coat of each aluminum particle may be carried out in different dispersive solutions, or it is also possible to carry out these steps in the same dispersive solution after properly adjusting the components.

<Description of Resin Composition>

A resin composition according to the present invention contains the inventive aluminum pigment and resin.

While the resin compoundable in the inventive resin composition is not particularly restricted, acrylic resin, alkyd resin, polyester resin, polyurethane resin, polyvinyl acetate resin, nitrocellulose resin, fluororesin or the like can be preferably used, for example.

While a color pigment other than the inventive aluminum pigment compoundable in the inventive resin composition is not particularly restricted, phthalocyanine, quinacridone, isoindolinone, perylene, azo lake, iron oxide, chrome yellow, carbon black, titanium oxide, pearl mica or the like can be listed, for example.

Further, while an additive compoundable in the inventive resin composition is not particularly restricted, a surface active agent, a hardener, an ultraviolet absorber, a static eliminator, a thickener, an extender pigment, a dyestuff, a corrosion inhibitor or the like can be listed.

The inventive resin composition may contain water, a hydrophilic solvent, an organic solvent etc. in addition to the aforementioned components.

The content of the inventive aluminum pigment in the inventive resin composition is preferably at least 0.1 percent by mass, more preferably at least 1.0 percent by mass with respect to the overall resin composition. Further, the content of the inventive aluminum pigment is preferably not more than 30 percent by mass, more preferably not more than 20 percent by mass.

A decorative (metallic) effect tends to lower if the content of the inventive aluminum pigment is smaller than 0.1 percent by mass, while the characteristics (weather resistance, corrosion resistance, mechanical strength etc.) of the resin composition may be insufficient if the content of the inventive aluminum pigment is larger than 30 percent by mass.

The inventive resin composition containing the inventive aluminum pigment can be blended into a paint or ink to be preferably used. Further, the resin composition can be particularly preferably used when blended into a water-based paint or water-color ink among paints and ink.

Further, the inventive resin composition, having an excellent appearance superior in metallicity with excellent weather resistance and stability also when the same is not employed as a paint or ink but solely used or kneaded into a rubber composition or a plastic composition to be formed, can be preferably employed as such.

<Description of Water-Based Paint and Water-Color Ink>

The inventive aluminum pigment can be preferably blended into a water-based paint or water-color ink along with a binder and a hydrophilic solvent.

While the binder employed for the water-based paint or the water-color ink containing the inventive aluminum pigment is not particularly restricted, resin such as acrylic resin, alkyd resin, polyester resin, polyurethane resin, polyvinyl acetate resin, nitrocellulose resin, fluororesin or the like can be preferably used, for example.

As the binder employed for the water-based paint or the water-color ink containing the inventive aluminum pigment, that other than resin can also be employed so far as the same is employed as a binder for a water-based paint or water-color ink in general and capable of forming an excellent film by solidification after application. More specifically, a polymeric composition such as a rubber composition, a plastic composition or a natural polymeric composition other than resin can be listed.

Further, while a color pigment other than the inventive aluminum pigment compoundable in the water-based paint or the water-color ink containing the inventive aluminum pigment is not particularly restricted, phthalocyanine, quinacridone, isoindolinone, perylene, azo lake, iron oxide, chrome yellow, carbon black, titanium oxide, pearl mica or the like can be listed, for example.

While an additive compoundable in the water-based paint or the water-color ink containing the inventive aluminum pigment is not particularly restricted, a surface active agent, a hardener, an ultraviolet absorber, a static eliminator, a thickener, an extender pigment or a dyestuff can be listed, for example.

While the hydrophilic solvent compoundable in the water-based paint or the water-color ink containing the inventive aluminum pigment is not particularly restricted, methyl alcohol, ethyl alcohol, isopropyl alcohol, n-propyl alcohol, t-butyl alcohol, n-butyl alcohol, isobutyl alcohol, ethyl cellosolve, butyl cellosolve, propyleneglycol monobutylether, dipropyleneglycol monomethylether, propyleneglycol monopropylether, acetone or the like can be listed, for example.

The aforementioned hydrophilic solvent may contain water, or water may be solely employed as the hydrophilic solvent. Further, one or at least two of the aforementioned hydrophilic solvents may be stirred and used in response to application.

The content of the inventive aluminum pigment in the water-based paint or the water-color ink containing the inventive aluminum pigment is preferably at least 0.1 percent by mass, and more preferably at least 1.0 percent by mass with respect to the content of the binder. Further, the content of the inventive aluminum pigment is preferably not more than 30 percent by mass, more preferably not more than 20 percent by mass with respect to the content of the binder.

The decorative (metallic) effect of a film of the water-based paint or the water-color ink tends to lower if the content of the inventive aluminum pigment is smaller than 0.1 percent by mass, while the characteristics (weather resistance, corrosion resistance, mechanical strength etc.) of the film of the water-based paint or the water-color ink may be insufficient if the content of the inventive aluminum pigment is larger than 30 percent by mass.

The content of the hydrophilic solvent in the water-based paint or the water-color ink containing the inventive aluminum pigment is preferably at least 20 percent by mass, more preferably at least 50 percent by mass with respect to the content of the binder. Further, this content of the hydrophilic solvent is preferably not more than 200 percent by mass, more preferably not more than 100 percent by mass with respect to the content of the binder.

The viscosity of the paint or the ink tends to be so high that it is difficult to handle the paint or the ink if the content of the hydrophilic solvent is less than 20 percent by mass, while the viscosity of the paint or the ink tends to be so low that it is difficult to form a film if the content of the hydrophilic solvent exceeds 200 percent by mass.

Application of the inventive aluminum pigment is not restricted to blending into a water-based paint or water-color ink but the same is preferably usable also when blended into a paint containing an organic solvent, ink containing an organic solvent, a powder paint, a rubber composition, a plastic composition, a natural polymeric composition or the like.

A method of applying or printing the water-based paint or the water-color ink containing the inventive aluminum pigment is not particularly restricted but any application or printing method can be employed in consideration of the form of the used water-based paint or water-color ink and the surface shape of a base. For example, spraying, a roll coater method, brushing or a doctor blade method can be employed as a method of applying the water-based paint containing the inventive aluminum pigment, while gravure printing or screen printing can be employed as a method of printing the water-color ink containing the inventive aluminum pigment.

A film formed by the water-based paint or the water-color ink containing the inventive aluminum pigment may be formed on an undercoat layer or an intermediate coat layer prepared by electrodeposition coating or the like, or a top coat layer may be formed on the film formed by the water-based paint or the water-color ink containing the inventive aluminum pigment.

In this case, a subsequent film layer may be applied after applying each film layer and hardening or drying the same, or the subsequent film layer may be applied after applying each film layer by the so-called wet-on-wet application without hardening or drying the same. In order to obtain a film having excellent specular brightness, however, it is preferable to apply a film layer of the water-based paint or the water-color ink containing the inventive aluminum pigment after applying a foundation coat layer and hardening or drying the same.

A paint composition forming each film layer may be thermally hardened or cold-set, for example. Further, the paint composition forming each film layer may be dried with hot air, or may be naturally dried at the ordinary temperature, for example.

The thickness of the film layer formed by the water-based paint or the water-color ink containing the inventive aluminum pigment, not particularly restricted in this case, is preferably at least 2 µm, more preferably at least 5 µm in a general embodiment. Further, the thickness of this film layer is not more than 100 µm, more preferably not more than 50 µm.

An effect of opacifying the underlayer with the ink or the paint tends to be insufficient if the thickness of the film layer is less than 2 µm, while drying tends to be so difficult that a defect such as boiling or sagging remarkably appears if the thickness of the film layer exceeds 100 µm.

While the present invention is now described in more detail with reference to Examples, the present invention is not restricted to these.

Referential Example 1

A solution obtained by gradually adding 0.5 g of metallic molybdenum powder to 10 g of hydrogen peroxide water containing 30% of hydrogen peroxide and making reaction was dissolved in 600 g of isopropyl alcohol, and stirred at 50° C. for 1 hour with addition of 153.8 g (aluminum content: 100 g) of a commercially available aluminum pigment (7640NS by Toyo Aluminum K.K., solid content: 65%).

Thereafter monoethanolamine was added to the aforementioned slurry for adjusting the pH value of the slurry to 8.5.

Then, 40 g of tetraethoxysilane (hereinafter abbreviated as TEOS) was added to the pH-adjusted slurry, which in turn was further stirred at 50° C. for 10 hours. The pH value of the slurry was checked every 2 hours in this process, and adjusted to be 8.5 by adding monoethanolamine.

After termination of the aforementioned reaction, the slurry was solid-liquid separated through a filter, and the slurry containing the obtained aluminum pigment was dried at 105° C. for 3 hours for obtaining a powdered aluminum pigment.

Referential Examples 2 to 8

Aluminum pigments according to Referential Examples 2 to 8 were prepared similarly to Referential Example 1.

Example 9

153.8 g (aluminum content: 100 g) of an aluminum pigment (7640NS by Toyo Aluminum K.K., solid content: 65%) and 3 g of 3-aminopropyl triethoxysilane employed as a catalyst were added to 600 g of IPA, and the mixture was stirred at 50° C. for 1 hour.

Thereafter monoethanolamine was added to the aforementioned slurry for adjusting the pH value of the slurry to 8.5.

Then, 30 g of TEOS and 10 g of decyl trimethoxysilane were added to the pH-adjusted slurry, which in turn was further stirred at 50° C. for 10 hours. The pH value of the slurry was checked every 2 hours in this process, and adjusted to be 8.5 by adding monoethanolamine.

After termination of the aforementioned reaction, the slurry was solid-liquid separated through a filter, and the slurry containing the obtained aluminum pigment was dried at 105° C. for 3 hours for obtaining a powdered aluminum pigment.

Example 10

A solution obtained by gradually adding 0.5 g of metallic molybdenum powder to 10 g of hydrogen peroxide water containing 30% of hydrogen peroxide and making reaction was dissolved in 600 g of isopropyl alcohol, and stirred at 50° C. for 1 hour with addition of 153.8 g (aluminum content: 100 g) of a commercially available aluminum pigment (7640NS by Toyo Aluminum K.K., solid content: 65%).

Thereafter monoethanolamine was added to the aforementioned slurry for adjusting the pH value of the slurry to 8.5.

Then, 30 g of TEOS and 10 g of phenyl triethoxysilane were added to the pH-adjusted slurry, which in turn was further stirred at 50° C. for 10 hours. The pH value of the slurry was checked every 2 hours in this process, and adjusted to be 8.5 by adding monoethanolamine.

After termination of the aforementioned reaction, the slurry was solid-liquid separated through a filter, and the slurry containing the obtained aluminum pigment was dried at 105° C. for 3 hours for obtaining a powdered aluminum pigment.

Comparative Examples 1 to 3

Aluminum pigments according to comparative examples 1 to 3 were prepared similarly to Referential Example 1. When preparing comparative example 2, however, the aluminum pigment caused abnormal reaction to remarkably generate hydrogen gas and agglomerate in the process of reaction for forming a silica coat, and hence no aluminum pigment according to comparative example 2 was obtained. Tables 1 to 3 show manufacturing conditions for the aluminum pigments according to Referential Examples 1-8. Examples 9-10 and comparative examples 1 to 3 and analytical values of compositions.

TABLE 1

Manufacturing Conditions for Aluminum Pigments and Analytical Values of Compositions

| Item | | | Referential Example 1 | Referential Example 2 | Referential Example 3 | Referential Example 4 | Referential Example 5 |
|---|---|---|---|---|---|---|---|
| Aluminum Particles | Quantity | (g/g) | 100 | 100 | 100 | 100 | 100 |
| Molybdenum Compound or Pretreatment | Type | | Mo/$H_2O_2$ 30% aq*[1] | phosphomolybdic acid*[2] | ammonium molybdate/water | Mo/$H_2O_2$ 30% aq*[1] | Mo/$H_2O_2$ 30% aq*[1] |
| | Quantity | (g/g) | 0.5/10 | 0.5 | 0.5/50 | 0.5/10 | 0.5/10 |
| Solvent | Type | | IPA*[3] | IPA*[3]/water | MFDG*[4] | IPA*[3] | IPA*[3] |
| | Quantity | (g) | 600 | 600/50 | 600 | 600 | 600 |
| Molybdenum Coat Covering Conditions | Temperature | (° C.) | 50 | 50 | 50 | 50 | 50 |
| | Time | (hr) | 1 | 1 | 1 | 1 | 1 |
| Organic Silicon Compound | Type | | TEOS*[5] | TEOS*[5] | tetramethoxysilane | — | TEOS*[5] |
| | Quantity | (g) | 40 | 40 | 30 | — | 80 |
| Silane Coupling Agent | Type | | — | — | — | methyl triethoxysilane | — |
| | Quantity | (g) | — | — | — | 20 | — |
| Hydrolytic Catalyst | | | triethanolamine | ethylenediamine | 3-aminopropyl triethoxysilane | ammonia water | triethanolamine |
| Covering Conditions for Silica Coat and/or Coat Prepared From Silane Coupling Agent | Temperature | (° C.) | 50 | 70 | 90 | 70 | 50 |
| | Time | (hr) | 10 | 6 | 20 | 10 | 10 |
| | pH value | | 8.5 | 9 | 9 | 7.5 | 8.5 |
| Heat Treatment | Temperature | (° C.) | 105 | 200 | 500 | 200 | 105 |
| | Time | (hr) | 3 | 3 | 3 | 3 | 3 |
| Analytical Value of Final Product (parts by weight with respect to 100 parts by weight of Al) | Mo | | 0.45 | 0.21 | 0.25 | 0.45 | 0.45 |
| | Si | | 4.6 | 4.4 | 4.8 | 2.8 | 9.3 |

TABLE 2

Manufacturing Conditions for Aluminum Pigments and Analytical Values of Compositions

| Item | | | Referential Example 6 | Referential Example 7 | Referential Example 8 | Example 9 | Example 10 |
|---|---|---|---|---|---|---|---|
| Aluminum Particles | Quantity | (g) | 100 | 100 | 100 | 100 | 100 |
| Molybdenum Compound or Pretreatment | Type | | Mo/$H_2O_2$ 30% aq*[1] | phosphomolybdic acid*[2] | Mo/$H_2O_2$ 30% aq*[1] | 3-aminopropyl triethoxysilane | Mo/$H_2O_2$ 30% aq*[1] |
| | Quantity | (g/g) | 0.5/10 | 2.5 | 0.5/10 | 3 | 0.5/10 |
| Solvent | Type | | IPA*[3] | MFDG*[4] | IPA*[3] | IPA*[3] | IPA*[3] |
| | Quantity | (g) | 600 | 600 | 600 | 600 | 600 |
| Molybdenum Coat Covering Conditions | Temperature | (° C.) | 50 | 50 | 50 | — | — |
| | Time | (hr) | 1 | 1 | 1 | — | — |
| Organic Silicon | Type | | TEOS*[5] | tetramethoxysilane | TEOS*[5] | TEOS*[5] | TEOS*[5] |

TABLE 2-continued

Manufacturing Conditions for Aluminum Pigments and Analytical Values of Compositions

| Item | | | Referential Example 6 | Referential Example 7 | Referential Example 8 | Example 9 | Example 10 |
|---|---|---|---|---|---|---|---|
| Compound | Quantity | (g) | 160 | 15 | 40 | 30 | 30 |
| Silane Coupling | Type | | — | — | — | DTMS*6 | PTES*7 |
| Agent | Quantity | (g) | — | — | — | 10 | 10 |
| Hydrolytic Catalyst | | | triethanolamine | 3-aminopropyl triethoxysilane | nitric acid | monoethanolamine | monoethanolamine |
| Covering Conditions for Silica Coat and/or Coat Prepared From Silane Coupling Agent | Temperature | (° C.) | 50 | 90 | 50 | 50 | 50 |
| | Time | (hr) | 10 | 20 | 40 | 10 | 10 |
| | pH value | | 8.5 | 9 | 2.5 | 8.5 | 8.5 |
| Heat Treatment | Temperature | (° C.) | 105 | 200 | 105 | 105 | 105 |
| | Time | (hr) | 3 | 3 | 3 | 3 | 3 |
| Analytical Value of Final Product (parts by weight with respect to 100 parts by weight of Al) | | Mo | 0.45 | 1.2 | 0.45 | 0 | 0.45 |
| | | Si | 17.5 | 2.5 | 1.8 | 4.7 | 4.5 |

TABLE 3

Manufacturing Conditions for Aluminum Pigments and Analytical Values of Compositions

| | Item | | | Comparative Example 1 | Comparative Example 2 | Comparative Example 3 |
|---|---|---|---|---|---|---|
| Heat Treatment | Aluminum Particles | Quantity | (g) | 100 | 100 | 100 |
| | Molybdenum Compound or Pretreatment | Type | | — | — | Mo/H$_2$O$_2$ 30% aq*1 |
| | | Quantity | (g/g) | — | — | 0.5/10 |
| | Solvent | Type | | IPA*3 | IPA*3/water | IPA*3 |
| | | Quantity | (g) | 600 | 600/50 | 600 |
| | Molybdenum Coat Covering Conditions | Temperature | (° C.) | 50 | 50 | 50 |
| | | Time | (hr) | 1 | 1 | 1 |
| | Organic Silicon Compound | Type | | TEOS*5 | TEOS*5 | — |
| | | Quantity | (g) | 40 | 40 | — |
| | Silane Coupling Agent | Type | | — | — | — |
| | | Quantity | (g) | — | — | — |
| | Hydrolytic Catalyst | | | triethanolamine | triethanolamine | — |
| | Covering Conditions for Silica Coat and/or Coat Prepared From Silane Coupling Agent | Temperature | (° C.) | 50 | 50 | — |
| | | Time | (hr) | 10 | 10 | — |
| | | pH value | | 8.5 | 8.5 | — |
| | Heat Treatment | Temperature | (° C.) | 105 | aluminum pigment reacted and agglomerated in the process of treatment | 200 |
| | | Time | (hr) | 3 | | 3 |
| Composition | Analytical Value of Final Product (parts by weight with respect to 100 parts by weight of Al) | | Mo | 0 | | 0.45 |
| | | | Si | 1.2 | | 0.1 |

Referring to Tables 1 to 3,
*1H$_2$O$_2$ 30% aq denotes an aqueous solution containing 30 percent by mass of H$_2$O$_2$.
*2The Mo content of phosphomolybdic acid is 47 percent by mass in terms of Mo metal.
*3IPA denotes isopropyl alcohol.
*4MFDG denotes dipropyleneglycol monomethylether.
*5TEOS denotes tetraethoxysilane.
*6DTMS denotes decyltrimethoxysilane.
*7PTES denotes phenyltriethoxysilane.

<Performance Evaluation>

The aluminum pigments obtained according to Referential Examples 1-8, Examples 9-10 and comparative examples 1 to 3 were subjected to performance evaluation on the basis of the following measuring or evaluation method. Tables 4 to 6 show the evaluation results.

(i) Measurement of Contents of Si and Mo

The contents of Mo and Si in each aluminum pigment were determined by plasma spectral analysis with ICPS-8000 by Shimadzu Corporation through a calibration curve employing a liquid extracted by an alkali dissolution/extraction method and Mo and Si standard solutions.

(ii) Evaluation of Stability 100 parts by mass of water was added to 100 parts by mass of powder of each aluminum pigment, the mixture was pasted, and the paste was preserved at 50° C. for 1 month and thereafter manually wet-screened in water with a JIS standard sieve having an aperture of 45 μm, for evaluating stability on the basis of the following standards:
○: aluminum pigment hardly changed
Δ: aluminum pigment partially agglomerated
x: most part of aluminum pigment agglomerated (iii) Measurement of Gas Yield in Water-Based Paint Each aluminum pigment was used for preparing a water-based paint having the following composition:

| | |
|---|---|
| Water-soluble acrylic resin (*1) | 28.2 g |
| Melamine resin (*2) | 4.4 g |

-continued

| | |
|---|---|
| Triethanolamine | 1.1 g |
| Deionized water | 44.8 g |
| Isopropyl alcohol | 3.0 g |
| Transparent iron oxide (*3) | 5.0 g |
| Aluminum pigment (Examples 1 to 8, comparative example 1, comparative example 3) | 3.0 g (solid content) |

(*1): Armatex WA911 by Mitsui Toatsu Chemicals, Inc.
(*2): Cymel 350 by Mitsui Toatsu Chemicals, Inc.
(*3) SICOTRANS RED L2175D by BASF 80 g of the water-based paint prepared in the aforementioned manner was sampled and stored in a water boiler adjusted to 50° C. for 7 days, for measuring a cumulative hydrogen gas yield by water displacement with a measuring cylinder.

(iv) Color Tone Evaluation of Film of Water-Based Paint Containing Aluminum Pigment After each water-based paint prepared in the aforementioned item (iii) of measurement of the gas yield in the water-based paint was air-sprayed to a test copper plate previously electrodeposition-coated with a temporary rust-prevention paint so that the thickness was 13 μm after drying and pre-dried at 90° C. for 10 minutes, an organic solvent type top coat paint having the following composition was air-sprayed so that the thickness was 40 μm after drying and dried at 140° C. for 30 minutes for preparing a metallic painted plate.

| | |
|---|---|
| Acrylic resin (*4) | 140 g |
| Melamine resin (*5) | 50 g |
| Solvesso 100 | 60 g |

(*4): Armatex 110 by Mitsui Toatsu Chemicals, Inc.
(*5): Uban 20SE60 by Mitsui Toatsu Chemicals, Inc.

The metallic luster of the metallic painted plate obtained in the aforementioned manner was subjected to 5-stage evaluation on the basis of the following standards. The metallic luster is improved in proportion to the numeral. Flip flop denotes such a property that the lightness varies with the angle of observation, and the lightness readily changes as the flip flop gets stronger.

5: extremely excellent in brightness and extremely strong in flip flop

4: excellent in brightness and strong in flip flop

3: ordinary both in brightness and in flip flop

2: slightly inferior in brightness and slightly weak in flip flop

1: inferior in brightness and weak in flip flop (v) Film Moisture Resistance/Adhesion Test Each painted plate obtained in the aforementioned item (iv) was left in an atmosphere of 40° C. with moisture of 100% for days, and an adhesion test was thereafter performed according to JIS K5600 5-6:1999. Tables 4 to 6 show the obtained results. The results are indicated in the following 5-stage evaluation:

5: no peeling

4: peeling: not more than 10%

3: peeling: 10 to 50%

2: peeling: 50 to 90%

1: peeling: 100%

TABLE 4

Evaluation Results of Aluminum Pigment and Water-Based Paint

| | Item | Referential Example 1 | Referential Example 2 | Referential Example 3 | Referential Example 4 | Referential Example 5 |
|---|---|---|---|---|---|---|
| Evaluation Result of Aluminum Pigment | Stability | ○ | ○ | ○ | ○ | ○ |
| Evaluation Result of Water-Based Paint | Gas Yield (cc) | 0 | 0 | 0 | 0 | 0 |
| | Color Tone of Painted Plate | 4 | 4 | 4 | 5 | 4 |
| | Moisture Resistance/ Adhesiveness of Film | 3 | 3 | 4 | 4 | 3 |

TABLE 5

Evaluation Results of Aluminum Pigment and Water-Based Paint

| | Item | Referential Example 6 | Referential Example 7 | Referential Example 8 | Example 9 | Example 10 |
|---|---|---|---|---|---|---|
| Evaluation Result of Aluminum Pigment | Stability | ○ | ○ | ○ | ○ | ○ |
| Evaluation Result of Water-Based Paint | Gas Yield (cc) | 0 | 0 | 0 | 0 | 0 |
| | Color Tone of Painted Plate | 3 | 5 | 5 | 5 | 5 |
| | Moisture Resistance/ Adhesiveness of Film | 3 | 4 | 3 | 5 | 5 |

TABLE 6

Evaluation Results of Aluminum Pigment and Water-Based Paint

| | | Comparative Example 1 | Comparative Example 2 | Comparative Example 3 |
|---|---|---|---|---|
| Evaluation Result of Aluminum Pigment | Stability | X | — | X |
| Evaluation Result of Water-Based Paint | Gas Yield (cc) | 16 | 6 | 5 |
| | Color Tone of Painted Plate | 2 | 1 | 5 |
| | Moisture Resistance/ Adhesiveness of Film | 2 | — | 2 |

It is understood from the results shown in Tables 4 to 6 that each of the water-based paints blended with the aluminum pigments according to Examples 9-10 generates absolutely no gas and is remarkably excellent in color tone of the painted plate and base adhesion of the film as compared with each of the water-based paints blended with the aluminum pigments according to comparative examples 1 to 3.

The embodiment and examples disclosed this time are to be considered as illustrative and not restrictive in all points. The scope of the present invention is shown not by the above description but by the scope of claim for patent, and it is intended that all modifications within the meaning and range equivalent to the scope of claim for patent are included.

INDUSTRIAL APPLICABILITY

From the aforementioned results, the inventive aluminum pigment, having excellent dispersibility and stability, neither generating hydrogen gas nor agglomerating during storage and exhibiting excellent designability of a film appearance, is suitably blended into a water-based paint or water-color ink.

It is possible to obtain an aluminum pigment having excellent dispersibility and stability, neither generating hydrogen gas nor agglomerating during stage and exhibiting excellent designability of a film appearance to be suitably blended into a water-based paint or water-color ink by employing the inventive method of manufacturing an aluminum pigment.

Further, the inventive resin composition, having excellent dispersibility and stability, neither generating hydrogen gas nor agglomerating during storage and exhibiting excellent designability of a film appearance, is suitably blended into a water-based paint or water-color ink.

In addition, the water-based paint or the water-color ink containing the inventive aluminum pigment has excellent water-dispersibility and stability, neither generates hydrogen gas nor agglomerates during storage and exhibits excellent designability of a film appearance.

The invention claimed is:

1. An aluminum pigment containing aluminum particles, a molybdenum coat comprising a molybdenum oxide and/or a molybdenum hydrate covering the surface of each of said aluminum particles, a silica coat comprising amorphous silica further covering said molybdenum coat and a coat prepared from a silane coupling agent on said silica coat, wherein the content of said molybdenum is in the range of 0.01 to 5 parts by mass with respect to 100 parts by mass of said aluminum particles, and the total content of silicon contained in said silica coat and said coat prepared from a silane coupling agent is in the range of 1 to 20 parts by mass with respect to 100 parts by mass of said aluminum particles.

2. The aluminum pigment according to claim 1, wherein said silane coupling agent is at least one compound selected from the group consisting of:

$R_A$—Si(OR$_B$)$_3$ and $R_A$—SiR$_B$(OR$_B$)$_2$, wherein $R_A$ is an alkyl group or an aryl group or an alkenyl group, having 2 to 18 carbon atoms and $R_B$ is an alkyl group having 1 to 3 carbon atoms.

3. A resin composition comprising the aluminum pigment according to claim 1 and a resin, wherein the content of said aluminum pigment is in the range of 0.1 to 30 percent by mass of overall said resin composition.

4. A method of manufacturing an aluminum pigment including the steps of:

forming a molybdenum coat comprising a molybdenum oxide and/or a molybdenum hydrate on the surface of each aluminum particle by stirring a dispersive solution containing aluminum particles and a molybdenum compound;

forming a silica coat comprising amorphous silica on the surface of said molybdenum coat of each said aluminum particle by adjusting the pH of a dispersive solution containing said aluminum particles each having said molybdenum coat, an organic silicon compound and a hydrolytic catalyst thereby hydrolyzing said organic silicon compound; and forming a coat prepared from a silane coupling agent on the surface of said silica coat of each said aluminum particle by adjusting the pH of a dispersive solution containing said aluminum particles each having said silica coat, said silane coupling agent and a hydrolytic catalyst thereby hydrolyzing said silane coupling agent, wherein the content of said molybdenum is in the range of 0.01 to 5 parts by mass with respect to 100 parts by mass of said aluminum particles, and the total content of silicon contained in said silica coat and said coat prepared from a silane coupling agent is in the range of 1 to 20 parts by mass with respect to 100 parts by mass of said aluminum particles.

5. A method of manufacturing an aluminum pigment by adjusting the pH of a dispersive solution containing aluminum particles each having a molybdenum coat, an organic silicon compound, a silane coupling agent and a hydrolytic catalyst thereby hydrolyzing said organic silicon compound and said silane coupling agent for forming a silica coat comprising amorphous silica on the surface of said molybdenum coat of each said aluminum particle while forming a coat prepared from said silane coupling agent thereon, wherein the content of said molybdenum is in the range of 0.01 to 5 parts by mass with respect to 100 parts by mass of said aluminum particles, and the total content of silicon contained in said silica coat and said coat prepared from a silane coupling agent is in the range of 1 to 20 parts by mass with respect to 100 parts by mass of said aluminum particles.

6. The aluminum pigment according to claim 1, wherein the content of said molybdenum is in the range of 0.05 to 2 parts by mass with respect to 100 parts by mass of said aluminum particles, and the total content of silicon contained in said silica coat and said coat prepared from a silane coupling agent is in the range of 2 to 15 parts by mass with respect to 100 parts by mass of said aluminum particles.

* * * * *